United States Patent [19]
Jurovsky

[11] 3,895,524
[45] July 22, 1975

[54] DIFFERENTIAL PRESSURE GAUGE

[76] Inventor: Albert Yakovlevich Jurovsky, ulitsa Balliiskaya, 4, kv. 94, Moscow, U.S.S.R.

[22] Filed: June 11, 1974

[21] Appl. No.: 478,336

[30] Foreign Application Priority Data
June 18, 1973 U.S.S.R.............................. 1933173

[52] U.S. Cl....................... 73/393; 73/407 R; 92/1; 92/97
[51] Int. Cl........................... G01l 19/04; G01l 7/08
[58] Field of Search ........ 73/407 R, 393, 406; 92/1, 92/97

[56] References Cited
UNITED STATES PATENTS

| | | | |
|---|---|---|---|
| 3,563,138 | 2/1971 | Symonds et al.................. | 73/407 R |
| 3,724,275 | 4/1973 | Battaglini......................... | 73/407 R |
| 3,822,596 | 7/1974 | Bonner............................. | 73/407 R |

*Primary Examiner*—Donald O. Woodiel
*Attorney, Agent, or Firm*—Holman & Stern

[57] ABSTRACT

A differential pressure gauge comprising a base, two membranes fastened along the outer contour to the opposite sides of the base and provided with rigid discs interconnected into an integral unit through a hole in the base. The membranes are located at a certain distance from the base and form, together with the latter, a pressuretight space filled with a liquid. The rigid discs are secured to the membranes on a circular zone in which there is a chamber formed between each membrane and the disc and communicating through a channel with the pressuretight space. The gauge also comprises a means connected with the rigid discs and intended to transmit the motion of the membranes caused by the difference of pressures, and a means intended to transform this motion into an output signal.

8 Claims, 4 Drawing Figures

PATENTED JUL 22 1975 3,895,524

SHEET 1

DIFFERENTIAL PRESSURE GAUGE

The present invention relates to the field of instrument building and more particularly it relates to differential pressure gauges.

Known in the art is a differential pressure gauge comprising a base, two membranes fastened along the outer contour to the opposite sides of the base and provided with rigid discs which are joined together through a hole in the base to form an integral unit. The membranes with rigid discs are located at a certain distance from the base and form, together with the latter, a pressuretight space filled with a liquid. Besides, the gauge comprises a means connected with the rigid discs and intended to transmit the motion of the membranes caused by the pressure difference and a means which transforms this motion into an output signal which is proportional to the difference of pressure, said second means being connected to the output of the first means (U.S. Pat. No. 3,563,138).

The known differential pressure gauge is characterized by reading errors caused by variations in the temperature and static pressure of the working medium. These factors change the initial volume of the liquid contained in the pressuretight space which is formed by the membranes with rigid discs and the base. Owing to the differences in the shape and size of membranes manifested, for example, by different effective areas, geometrical dimensions and rigidity of casings, there occurs unwanted motion of said membranes which is transformed into an output signal. The magnitude of this signal is, in fact, the additional error caused by changes in the temperature or static pressure of the working medium.

An object of the present invention is to improve the accuracy of the differential pressure gauge by diminishing the errors caused by the changes in the temperature and static pressure.

Another object of the invention is to improve the corrosion resistance of the differential pressure gauge.

This object is accomplished by providing a differential pressure gauge which comprises a base, two membranes secured along the outer contour to the opposite sides of the base and provided with rigid discs interconnected into an integral unit through a hole in the base, said membranes being located at a certain distance from the base and forming, together with the latter, a pressure-tight space filled with a liquid; besides, the gauge comprises a means connected with the rigid discs and intended to transmit the motions of the membranes caused by the difference of pressures and a means interacting with the first means and intended to transform the motions of the membranes into an output signal wherein, according to the invention, each rigid disc is fastened to the membrane along a circular zone in which there is a chamber formed between the membrane and the disc and communicating through a channel with the pressuretight space.

It is practicable that the surface of the disc inside the chamber should be corrugated, the shape of disc corrugations corresponding to that of membrane corrugations.

It is good practice to provide the rigid disc with a projection located along the outer contour, the face surface of said projection corresponding in shape to the surface of the circular zone of the membrane.

It is also possible to make the rigid disc in the form of a round plate with the portion of the membrane inside the circular zone protruding above the rest of the membrane.

It is good practice to provide the rigid disc with a valve for tight closing of the hole in the base in case of one-sided effect of overload pressure.

The differential pressure gauge according to the present invention features the following advantages.

It ensures a high accuracy in measuring the pressure difference owing to the fact that each membrane is fastened to the rigid disc on a circular zone whereas the middle of the membrane located inside the circular zone forms, together with the disc, a chamber which is in communication with the liquid-filled space of the instrument. This middle portion of the membrane functions as an expansion piece intended to make up for the changes in the volume of the liquid in the gauge caused by such external factors as temperature and pressure.

The advantages of such an instrument become particularly conspicuous while measuring small pressure differentials when the membranes and rigid discs and, consequently, the middle portions of the membranes are of a comparatively large diameter in which case said middle portions of the membranes are characterized by high elasticity.

Another advantage of the gauge according to the invention is simplicity in improving the measurement accuracy and reducing the temperature errors and the errors caused by compressibility of liquid under the effect of static pressure.

The expansion pieces formed by the middle portion of each membrane do not disturb the integrity of its casing which raises the corrosion resistance of the instrument in comparison with the instruments provided with other types of expansion pieces since the expansion pieces according to the invention have no additional welded joints and additional parts contacting the working medium.

Still another advantage of the gauge is simplicity in protecting the membrane with its middle portion — expansion piece — against one-sided pressure overload. Owing to the provision of two expansion pieces (on each membrane), one-sided pressure overload of one membrane does not overstrain the casing of the other membrane because the liquid forced from under the middle and peripheral portions of the overloaded membranes acts on the corresponding zones of the other membrane. Besides, the provision of two expansion pieces promotes the accuracy of measurements and decreases the effect of temperature and static pressure.

Now the invention will be described by way of example with reference to the accompanying drawings, in which.

Figure 1:
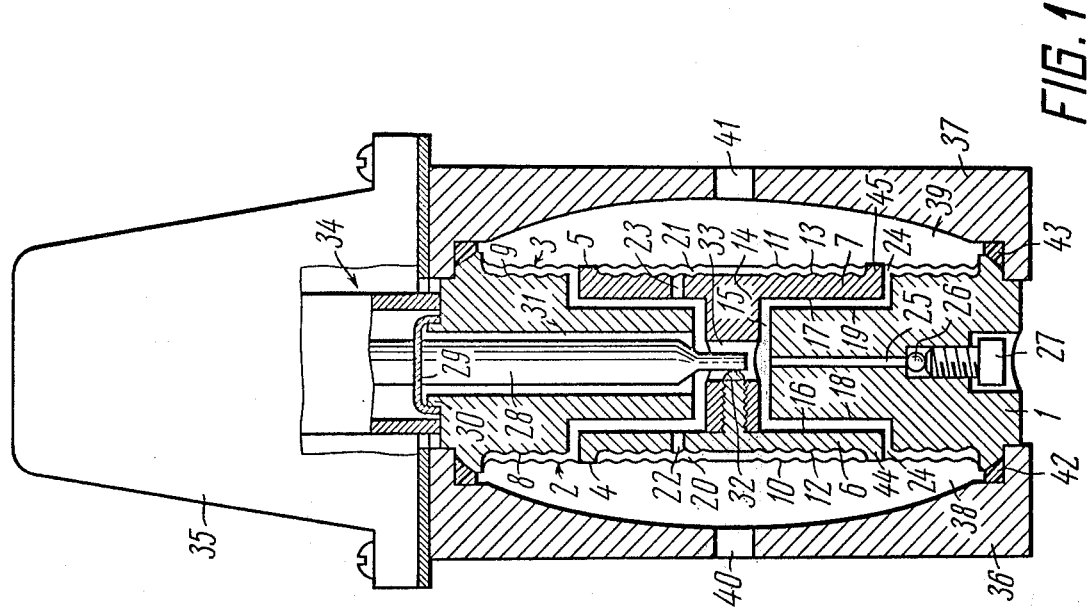
FIG. 1 is a longitudinal section of the differential pressure gauge according to the invention.

According to FIG. 1, the differential pressure gauge comprises a disc-shaped base 1 and two membranes 2 and 3 secured along the outer contour to the opposite sides of the base 1. Each membrane 2 and 3 has a circular zone 4 and 5, respectively, to which rigid discs 6 and 7 are fastened. The discs 6 and 7 are connected, respectively, with the circular zones 4 and 5 of the membranes 2 and 3 by means of welding without disturbing the pressuretightness and integrity of the casings of the membranes 2 and 3 which improves the corrosion resistance of the instrument.

The peripheral portions of each membrane 2 and 3 located between the outer contour and the circular zone 4 and 5 are located at a certain distance from the surfaces 8, 9 of the base 1. The middle portions 10, 11 of the membranes 2 and 3 enclosed in their circular zones 4, 5 are located at a certain distance from the surfaces 12, 13 of the rigid discs 6, 7. The surfaces 8, 9 of the base 1 and the surfaces 12,13 of the rigid discs 6, 7 facing the membranes 2, 3 correspond in shape to the membrane corrugations with a view to protecting the membranes 2, 3 against damage under the one-sided effect of overload pressure.

The rigid discs 6 and 7 are interconnected into an integral unit by a connector passing through a hole 15 in the base 1. The bearing surfaces 16, 17 of the discs 6 and 7 are set at a certain distance from the bearing surfaces 18, 19 of the base 1 for limiting the motion of the membranes 2, 3 under the one-sided effect of overload pressure. Chambers 20, 21 formed by the middle portions 10, 11 of the membranes 2, 3 and by the rigid discs 6, 7 are connected by channels 22, 23 with a pressuretight space 24 formed by the base 1 and the membranes 2, 3. The chambers 20, 21 and the space 24 are filled with liquid through a channel 25 which is sealed by a ball 26 and a screw 27.

A means intended to transmit the motions of the membranes 2, 3 caused by the pressure difference comprises a lever 28 with a pressuretight flexible support in the form of a small-diameter membrane 29 fastened to the projection 30 of the base 1. One end of the lever 28 located with a certain clearance in the hole 31 of the base 1 interacts with the rigid discs 6, 7 with the aid of a projection 32 which extends through a hole 33 in the connector 14 and contacts the end of the lever 28. The other end of the lever 28 located outside the base 1 on the other side of the pressuretight membrane 29 interacts with a means 34 which is secured on the base 1 and is intended to transform the motion of the membranes into an output signal. This means can be constituted by any conventional electric or pneumatic converter. The version of the invention described herein utilizes an electric converter with power compensation. The means 34 is protected by a housing 35.

Secured to the base 1 are flanges 36 and 37 which form spaces 38, 39 for the delivery of measured pressures to the membranes 2, 3 through holes 40, 41. Sealing rings 42, 43 made of fluorinated plastic seal the spaces 38, 39 along the outer contour of the membranes 2, 3. The flanges 36, 37 and the membranes 2, 3 can be made of various corrosion-resistant materials such as hastelloy, titanium, nickel, tantalum, etc.

The rigid discs 6, 7 have circular projections 44, 45 for fastening to the circular zones 4, 5 of the membranes 2, 3 and their face surfaces correspond to the shape of membrane corrugations.

Figure 2:
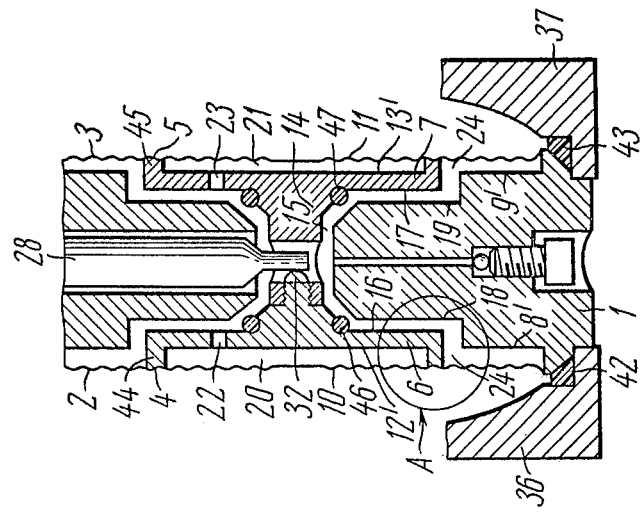
FIG. 2 is a sectionalized view of another version of the membrane assembly of the gauge according to the invention.

Unlike the instrument shown in FIG. 1, the surfaces $12^1$ and $13^1$ of the rigid discs 6 and 7 as well as the surfaces $8^1$ and $9^1$ of the base 1 of the gauge shown in FIG. 2 are flat. In this case the membranes 2, 3 are protected against damage by one-sided pressure overloads with the aid of valves 46, 47 in the form of rubber ring which are slipped on the connector 14 at the point where it is jointed with the rigid discs 6, 7 and which are intended to close the hole 15 in the base 1.

The ratio of the diameters of the circular zones 4, 5 of the membranes 2, 3 (FIGS. 1 and 2) to the diameters of their outer contour varies from 0.4 to 0.9 depending on the required effective area of the membranes 2, 3 and the volume of the liquid contained in the internal pressuretight space 24 of the gauge. An increase in the ratio of these diameters increases the relative elasticity of the middle portion 10 or 11 of each membrane 2, 3 and reduces additional errors caused by changes in temperature and static pressure.

Figure 3:
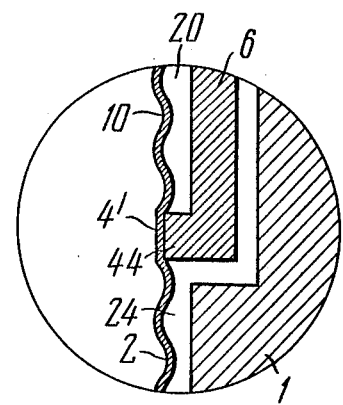
FIG. 3 is a version of zone A in FIG. 2 with the rigid disc whose circular projection has a flat face surface.

In FIG. 3 illustrating zone A in FIG. 2 the circular zone $4^1$ of the membrane 2 is flat and so is the face surface of the circular projection 44.

Figure 4:
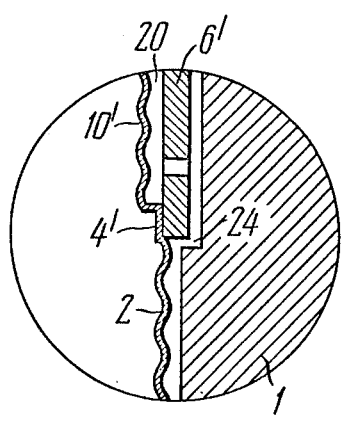
FIG. 4 is another version of zone A in FIG. 2 with a rigid disc in the form of a round plate.

In FIG. 4 illustrating another version of zone A in FIG. 2 the rigid disc $6^1$ is made as a round plate and the middle portion $10^1$ of the membrane 2 protrudes above the rest of the membrane 2.

Selection of a particular shape of the circular zones 4, 5 of the membranes 2, 3 and the configuration of the rigid discs 6, 7 depends on the manufacturing technology, for example, on the method of fastening the discs 6, 7 to the membranes 2, 3 (various kinds of welding, glueing, soldering). For example, the version shown in FIG. 3 is preferable when the membranes 2, 3 are fastened to the discs 6, 7 by resistance seam welding.

The differential pressure gauges functions as follows.

The higher of the two measured pressures is fed to the membrane 2 (FIG. 1) through the hole 40 in the flange 36. The lower pressure is fed to the membrane 3 through the hole 41 in the flange 37. Both pressures are transformed by the membranes 2 and 3 into proportional forces directed towards each other and acting along the common axis of the membranes 2, 3 and rigid discs 6 and 7.

The resultant force which is equal to the difference of the acting forces is transmitted by the stop 32 to the lever 28 which turns through a certain angle relative to the axis of the membrane 29. The end of the lever 28 located outside the base 1 interacts with the means 34 which transforms the motion of the membranes 2, 3 into an electric output signal which is proportional to the difference of pressures.

The middle portions 10 and 11 of the membranes 2, 3 are flexible expansion pieces which make up for the changes in the initial volume of the liquid contained in the pressuretight space 24 of the gauge. These changes in the liquid volume caused by variations in the temperature and/or static pressure acting on both sides of the membranes 2 and 3 is taken to a large extent by the flexible casings of the middle portions 10, 11 of the membranes 2, 3 because their elasticity is higher than that of the peripheral portions of the membranes 2, 3. Two flexible expansion pieces in the form of the middle portions 10, 11 of the membranes 2, 3 reduce additionally the temperature and static pressure errors because an increase in the volume of liquid causes practically no displacement of the membranes 2, 3 from their initial positions.

The differential pressure gauge according to the invention will be used most successfully for measuring small pressure differentials. In this case the membranes 2, 3 have a sufficiently large effective area determined by the diameters of their outer contour and those of the rigid discs 6, 7. An increase in the diameters of the rigid discs 6, 7 increases the effective area and elasticity of the middle portions 10, 11 of the membranes 2, 3 thereby reducing additional errors caused by variations in temperature and static pressure.

When the membrane 2 (FIG. 2) is subjected to one-sided overload pressure, its peripheral and middle portions are pressed against the shaped surfaces 8 and 12 which match the shape of membrane corrugations and thus protect the membrane 2 against damage.

The middle portion 10 of the membrane 2 together with the rigid disc 6 moves until the bearing surface 16 of the disc 6 comes in contact with the bearing surface 18 of the base 1. The membrane 3 together with the rigid disc 7 comes away from the surface 9 of the base 1 and the middle portion 11 moves back from the surface 13 of the rigid disc 7 thereby increasing the volume of the chamber 21 which receives the liquid forced out of the chamber 20 through the channels 22 and 23.

Should the membrane 3 be subjected to one-sided overload pressure, it will be protected in a similar manner.

The gauge whose membrane assembly is shown in FIG. 2 functions similarly to the one described above.

In case of one-sided overload pressure applied to the membrane 2 this gauge operates as follows. Under the effect of overload pressure the middle portion 10 of the membrane 2 together with the rigid disc 10 move until the bearing surface 16 of the disc 6 comes in contact with the bearing surface 18 of the base 1 after which the valve 46 seals off the hole 15 in the base 1 and prevents the liquid from being forced from under the peripheral and middle portions of the membrane 2. The liquid locked between the membrane 2 with disc 6, valve 46 and base 1 prevents the deflection of the casings of the peripheral and middle portions of the membrane 2 thus protecting it against failure.

The membrane 3 is protected against failure under the effect of one-sided overload pressure in a similar way in which case the hole 15 of the base 1 is sealed off by the valve 47.

I claim:

1. A differential pressure gauge comprising: a base; two membranes subjected to the effect of pressures; said membranes are fastened along the outer contour to the opposite sides of, and at a certain distance from, said base; a pressuretight space between said base and said membrane; two rigid discs secured, each, tightly to one of said membranes on a circular zone and located inside said pressuretight space; two chambers formed between said rigid discs and said membranes inside said circular zones; channels which put each of said chambers in communication with said pressuretight space; a hole in said base; a rigid connector passing through said hole and secured rigidly to said rigid discs; a means joined with said connector and intended to transmit the motion of said membranes; a means for transforming the motion of said membranes into an output signal, said means interacting with said first means; a liquid which fills said pressuretight space and said chambers 2. A differential pressure gauge according to claim 1 wherein the surfaces of said discs inside said chambers are corrugated and match the shape of said membrane corrugations.

3. A differential pressure gauge according to claim 1 wherein said rigid discs have projections arranged along the outer contour; the face surface of each of said projections follows the shape of the surface of said circular zones of said membranes and is intended for fastening to said surfaces.

4. A differential pressure gauge according to claim 2 wherein said rigid discs have projections arranged along the outer contour, the face surfaces of said projections following the shape of the surfaces of said circular zones of said membranes.

5. A differential pressure gauge according to claim 1, wherein said rigid discs are made in the form of round plates and the portions of said membranes inside said circular zones protrude above the rest of said membranes 6. A differential pressure gauge according to claim 1 wherein said rigid discs have valves for sealing off said hole in said base in case of one-sided overload pressure.

7. A differential pressure gauge according to claim 3, wherein said rigid discs have valves for sealing off said hole in said base.

8. A differential pressure gauge according to claim 5, wherein said rigid discs have valves for sealing off said hole in said base.

* * * * *